United States Patent [19]
Terasawa et al.

[11] Patent Number: 6,106,100
[45] Date of Patent: Aug. 22, 2000

[54] RECORDING APPARATUS AND METHOD FOR FORMING PLURAL DOTS IN A PIXEL

[75] Inventors: Koji Terasawa, Mitaka; Makoto Takemura, Tokyo; Katsuyuki Yokoi, Yokohama, all of Japan

[73] Assignee: Canon Kabushiki Kaisha, Tokyo, Japan

[21] Appl. No.: 08/453,577

[22] Filed: May 26, 1995

Related U.S. Application Data

[63] Continuation of application No. 07/915,405, Jul. 20, 1992, abandoned, which is a continuation of application No. 07/531,640, Jun. 1, 1990, abandoned.

[30] Foreign Application Priority Data

Jun. 2, 1989 [JP] Japan ................................. 1-139310
Dec. 18, 1989 [JP] Japan ................................. 1-325839

[51] Int. Cl.$^7$ ................................................ B41J 2/145
[52] U.S. Cl. .................................................. 347/40; 347/43
[58] Field of Search .......................... 347/40, 41, 43, 347/5, 16

[56] References Cited

U.S. PATENT DOCUMENTS

| | | | |
|---|---|---|---|
| 4,313,124 | 1/1982 | Hara ............................................ | 347/57 |
| 4,345,262 | 8/1982 | Shirato et al. ............................. | 347/10 |
| 4,459,600 | 7/1984 | Sato et al. .................................. | 347/47 |
| 4,463,359 | 7/1984 | Ayata et al. ................................ | 347/56 |
| 4,558,333 | 12/1985 | Sugitani et al. ........................... | 347/65 |
| 4,617,580 | 10/1986 | Miyakawa ............................. | 347/14 X |
| 4,680,596 | 7/1987 | Logan ....................................... | 347/15 |
| 4,723,129 | 2/1988 | Endo et al. ................................ | 347/56 |
| 4,740,796 | 4/1988 | Endo et al. ................................ | 347/56 |
| 4,748,453 | 5/1988 | Lin ............................................. | 347/41 |
| 4,788,563 | 11/1988 | Ono ........................................... | 347/14 |
| 4,809,063 | 2/1989 | Moriguchi ............................. | 347/43 X |
| 4,882,621 | 11/1989 | Suzuki ..................................... | 358/80 |
| 4,894,665 | 1/1990 | Davis .................................... | 347/43 X |
| 4,930,018 | 5/1990 | Chan ..................................... | 347/43 X |
| 4,967,203 | 10/1990 | Doan ......................................... | 347/41 |
| 5,155,503 | 10/1992 | Tasaki .................................... | 347/9 X |

FOREIGN PATENT DOCUMENTS

| | | |
|---|---|---|
| 0300743 | 1/1989 | European Pat. Off. . |
| 0317140 | 5/1989 | European Pat. Off. . |
| 54-56847 | 5/1979 | Japan . |
| 58-39468 | 3/1983 | Japan ................................. B41J 3/04 |
| 58-194541 | 11/1983 | Japan ................................. B41J 3/00 |
| 59-123670 | 7/1984 | Japan . |
| 59-138461 | 8/1984 | Japan . |
| 60-71260 | 4/1985 | Japan . |
| 60-153669 | 8/1985 | Japan ............................. H04N 1/23 |
| 63-188052 | 3/1988 | Japan . |

*Primary Examiner*—John Barlow
*Assistant Examiner*—Craig A. Hallacher
*Attorney, Agent, or Firm*—Fitzpatrick, Cella, Harper & Scinto

[57] ABSTRACT

There is disclosed a dot forming method and a recording apparatus, suitable for unprocessed recording medium, such as plain paper having fluctuation in its ink absorbing ability, or a plastic sheet with low ink absorbing ability. At the formation of each pixel with plural dots, the dots are so distributed that they are not continuous but are mutually complementary in the transverse and longitudinal directions of the pixel and also at least in the boundary area of adjacent pixels.

14 Claims, 8 Drawing Sheets

MATRIX 2×2

5×5

RECORDING APPARATUS AND METHOD FOR FORMING PLURAL DOTS IN A PIXEL

This application is a continuation of application Ser. No. 07/915,405 filed Jul. 20, 1992, now abandoned, which is a continuation of application Ser. No. 07/531,640 filed Jun. 1, 1990, abandoned.

BACKGROUND OF THE INVENTION

1. Field of the Invention

The present invention relates to a recording apparatus and a method for forming a matrix of plural dots for use therein, and more particularly to a recording apparatus, and a recording method for use therein, for forming each pixel (picture element) corresponding to the recording data by a dot matrix.

2. Related Background Art

The method of forming each pixel with a dot matrix is known as one of the methods generally used for recording the image involving tonal gradation (harmonization), and produces multiple density levels by varying the number and position of the dots constituting the matrix.

It is also known, even when the tonal gradation is not required, to vary the dot shooting, or shoot or form plural dots on the same position for increasing the image density. It is furthermore known that, in the ink jet recording apparatus, each pixel can be simply formed with a dot matrix, by the recent development of high-resolution recording head, with extremely reduced dimensions of discharge ports and distances thereof.

On the other hand, such ink jet recording apparatuses are becoming widely used in various image recording apparatuses such as copying machines or facsimile apparatuses, and the recording media used therein are no longer limited to the coated paper exclusively designed for recording but have been diversified, including for example plain paper and overhead projector (OHP) films.

Such recording media are different in ink absorbing ability, and recording on a recording medium with low ink absorbing ability may result in deterioration of the recorded image quality, due to the ink mixing among different pixels resulting from ink blotting. The influence of such ink blotting on the image quality is particularly evident in case of color image recording, in which inks of different colors are in mutual contact between different pixels.

For this reason, in case of forming each pixel by the above-mentioned dot matrix on plain paper or the like with low ink absorbing ability, a vertical dot column between adjacent matrixes may be conventionally left as a blank for absorbing the ink, thereby reducing the influence of ink blotting.

In such method, however, because all the vertical dot columns between the adjacent matrixes are left blank, the pixels appear as streaks and the overall density is lowered, whereby the recorded image quality may be eventually deteriorated.

It is also known, in the recording on a medium with low ink absorbing ability such as an OHP film, to obtain a desired density by forming each dot by so-called overlay printing in which plural ink dots are overlaid, thereby causing spreading of ink on the recording medium.

However, in such conventional methods of leaving a dot column blank, the spreading of ink tends to take place only in a certain direction (namely in the direction of said vertical dot column), to result in uneven ink spreading, whereby the image density may be not only unable to reach the desired level but also may become uneven.

SUMMARY OF THE INVENTION

In consideration of the foregoing, a principal object of the present invention is to provide a recording apparatus and a dot shooting or printing method, capable of providing an appropriate image density and a desired boundary state between pixels.

Another object of the present invention is to provide a recording apparatus and a dot forming method, capable of high density recording on a recording medium processed in advance to match the apparatus and capable of absorbing and fixing the ink, and, in a recording mode with an unprocessed recording medium, capable of improving the image quality of varying the method of dot formation.

Still another object of the present invention is to provide a recording apparatus and a recording method, capable of providing satisfactory image quality despite significant fluctuation in the characteristics of unprocessed recording medium.

The unprocessed recording medium includes a recording medium processed at a lower level in comparison with the recording medium so processed to sufficiently cope with the maximum deposited ink amount, a plastic sheet, a composite sheet having an ink absorbing layer on a plastic sheet, plain paper and recycled paper.

Still another and more specified object of the present invention is to provide a recording apparatus capable of so arranging the dots as to maximize the distance therebetween both within each pixel and at the boundary of pixels, in order to achieve uniform ink spreading while reducing the influence of ink blotting, thereby preventing the loss of unevenness in the density and stabilizing the recorded image quality.

The foregoing objects can be attained, according to the present invention, by a recording apparatus capable of forming each pixel with a matrix of plural dots on a recording medium, comprising:

a recording mechanism provided with plural discharge units for discharging droplets of recording liquid, capable of a recording mode for recording on an unprocessed recording medium; and recording control means for controlling said recording mechanism in said recording mode in such a manner that the plural dots constituting a pixel are not continuous but separated in the horizontal and vertical directions of the pixel and that the dots in the boundary zones of adjacent pixels are not continuous but separated in said horizontal and vertical directions.

Also the foregoing objects can be attained, according to the present invention, by a recording method for forming plural dots in a pixel on an unprocessed recording medium, comprising steps of:

forming, on said recording medium, plural dots in a matrix arrangement constituting each pixel in such a manner that said dots are not continuous but separated in the horizontal and vertical directions of said matrix; and forming, on said recording medium, dots in the boundary zones of adjacent pixels in such a manner that said dots are not continuous but separated in the horizontal and vertical directions.

The above-mentioned recording apparatus and recording method are particularly effective in case said dots are formed by ink droplets discharged from corresponding plural discharge units, and the dot of at least one of colors is formed by overlaid deposition of droplets from plural recording heads.

Furthermore, if the ink droplets are formed by membrane boiling action of an electrothermal converting member, there can be minimized the ink blotting, and the image fixation can be accelerated by the heat in the ink, whereby excellent image quality can be obtained.

Thus the present invention can provide uniform density and improved image quality and present local distortion of image quality, in any image involving tonal gradation, particularly in a high density recording. Also the present invention can extend the limits in the characteristics of the recording medium itself, and enables source use of plastic sheet or plain paper requiring plural printing operations. Also the present invention provides a recording apparatus characterized by a low running cost while reducing the cost of the recording medium itself and providing high quality image.

Still another object of the present invention is to provide a recording apparatus for providing a record by a dot pattern of ink dots formed on a recording medium according to dot data, comprising dot data supply means for supplying said dot data in such a manner as to maximize the distance of adjacent dots in said dot pattern.

More preferably there is provided a recording apparatus for providing a record by pixels composed of dot patterns of ink dots formed on a recording medium according to dot data, comprising dot data supply means for supplying said dot data in such manner as to maximize the distance of adjacent dots in said dot patterns and to maximize the distance between dots constituting a boundary of a pixel and dots constituting said boundary of an adjacent pixel.

In the above-explained structure, the adjacent dots are arranged with maximum distance therebetween within a dot matrix constituting a pixel and also at the boundary between the adjacent pixels, thereby reducing the ink blotting and obtaining pixels with uniform ink spreading.

Also there is enabled so-called all-black recording with a time interval.

Furthermore there is enabled double-speed recording, depending on the scanning speed.

A more important mode included in the present invention, for obtaining a high density (for example all-black image) is achieved by forming dots which are not continuous in the horizontal and vertical directions in each pixel and between adjacent pixels, and forming, for example in a second scan when the previously formed dots are fixed to a certain extent, new dots which are not continuous in the horizontal and vertical directions so as to fill in the areas not previously printed. Such all-black image is obtained by all-black recording in which the entire points of a matrix are printed. It is not limited to the image printed with only ink of black color.

DESCRIPTION OF THE PREFERRED EMBODIMENTS

Now the present invention will be clarified in detail by embodiments thereof shown in the attached drawings.

Figure 1:
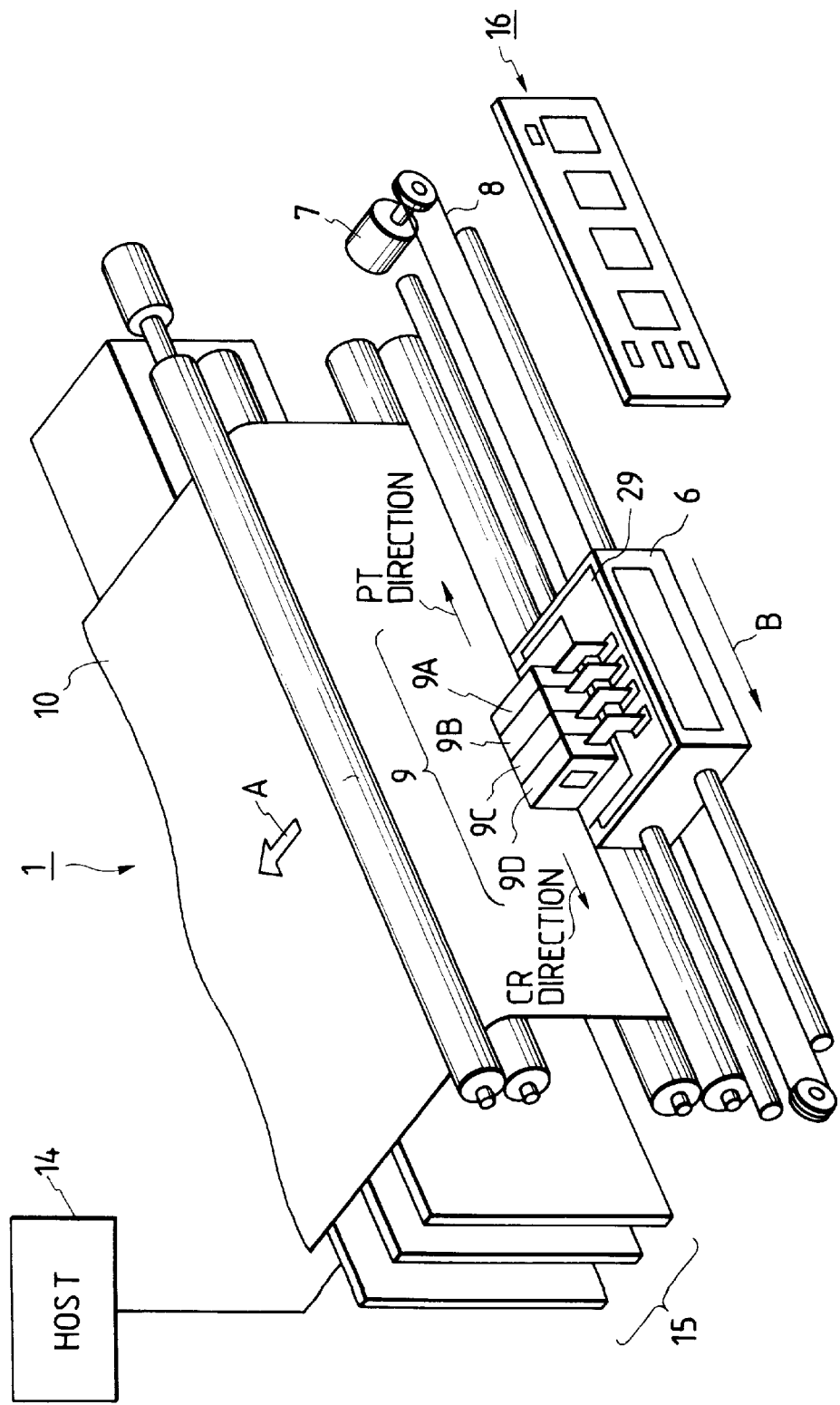
FIGS. 1 and 2 are respectively a schematic perspective view and a block diagram of an ink jet recording apparatus embodying the present invention.

FIG. 1 is a schematic perspective view of an ink jet recording apparatus constituting an embodiment of the present invention.

In FIG. 1, a recording apparatus 1 is principally composed of following components. A carriage 6 is slidably fitted on a guide shaft and is connected to a wire 8 extended parallel to said guide shaft and converting the rotation of a carriage motor 7 into a linear motion, whereby said carriage 6 is rendered movable in a direction parallel to said guide shaft (main scanning direction). An ink jet recording mechanism 9 is mounted on the carriage 6 and is provided with four recording heads 9A–9D for recording on a recording medium 10 while moving in said main scanning direction. Said recording heads 9A, 9B, 9C, 9D respectively corresponding to four-colored inks of black (Bk), cyan (C), magenta (M) and yellow (Y), and each head discharges ink droplets by thermal energy of electrothermal converting members provided in plural discharge units. The recording head causes film boiling in solid or liquid ink by the thermal energy generated by the electrothermal converting member functioning as an ink discharge energy generating element, and effects the ink droplet discharge, utilizing rapid bubble formation. Each of the recording heads 9A–9D is provided with 64 discharge ports arranged along a direction (sub scanning direction) perpendicular to said main scanning direction and opposed to the recording medium 10 to be explained later. A line, composed of plural rows of dots, as will be explained later, can be formed by ink discharge from the discharge ports, in a forward movement (hereinafter called a main scanning motion) of the above-explained recording head or in a cycle of forward and reverse motions thereof.

The recording medium 10 is advanced in a direction A by a pair of transport rollers positioned at the upper end of a recording plane opposed to the discharge ports of said recording heads 9A–9D. The recording plane of the recording medium 10 is defined by said transport rollers and another pair of transport rollers positioned at the lower end of the plane.

A controller 15 formed as printed circuit boards includes a CPU 15A, ROM 15B, RAM 15C etc. for controlling the functions of components of the apparatus 1 and the data processing therein.

In the recording apparatus 1 principally composed of the components explained above, the controller 15 effects, in response to commands transferred from a host equipment 14 such as a personal computer utilizing the present apparatus as a record output unit, a recording operation and necessary processing therefor based on the recording data similarly transferred.

The entry of commands to the recording apparatus 1 and the setting of recording conditions therein can also be made by a panel 16 thereof, having indicators showing the state of the recording apparatus and switches for entering various instructions. The panel 16 can also select various recording modes according to the kind of recording medium as will be explained later.

Figure 2:
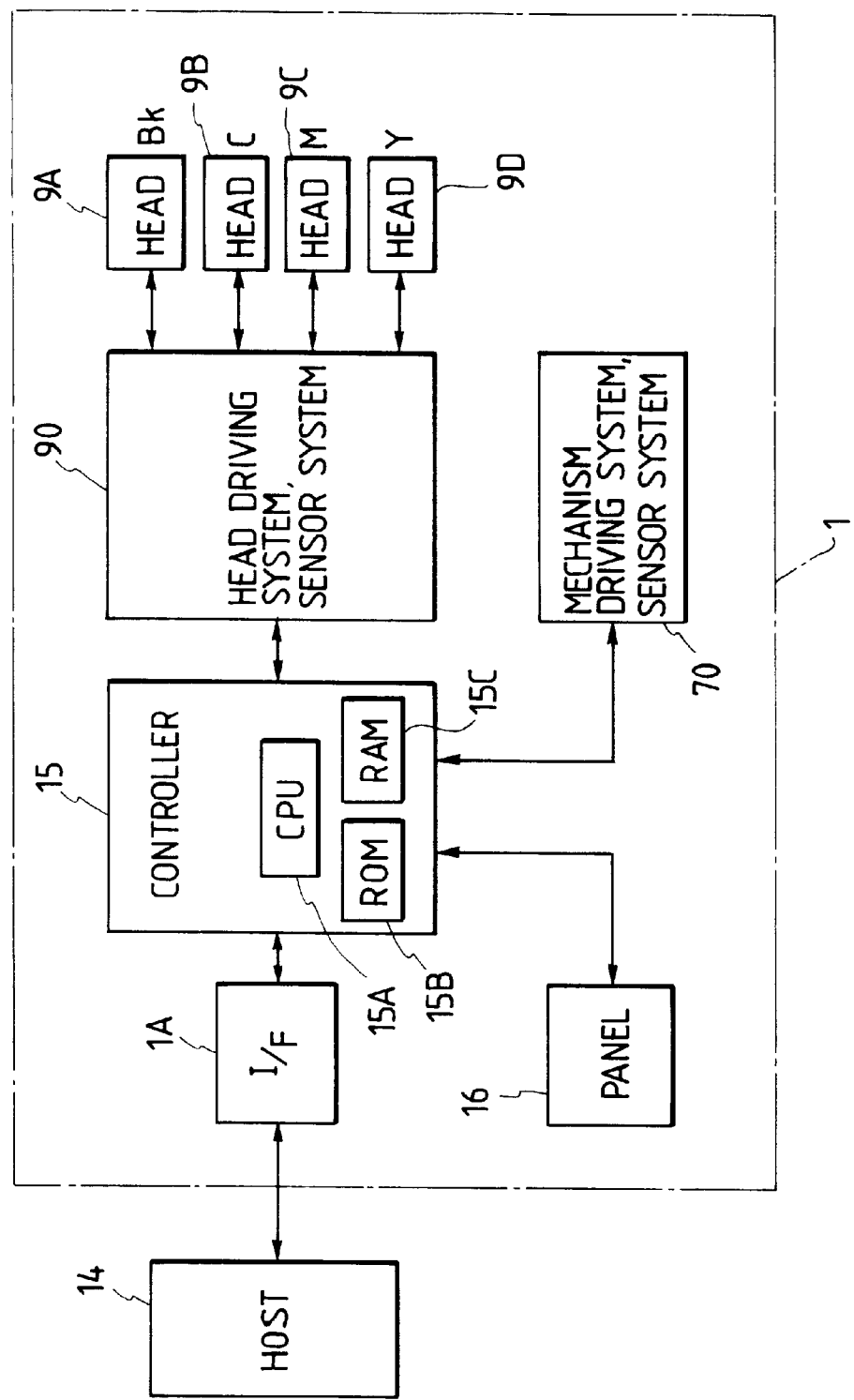

FIG. 2 is a block diagram of the recording apparatus shown in FIG. 1. The controller 15 receives the recording data corresponding to the pixels from the host equipment 14 through an interface 1A, converts the data into dot data corresponding to the discharge ports of the recording heads 9A–9D, and stores said dot data in a data buffer in the RAM 15C, in the unit of a main scan of the recording head, namely a main scanning line recorded on the recording medium. The dot data thus stored are transferred to a head driving system 90 at a timing in accordance with the main scanning of the recording heads 9A 9D, thus driving the recording heads.

Figure 3A:
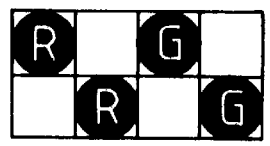
FIGS. 3A, 3B and 4 are schematic views of dot matrix patterns constituting embodiments of the present invention.
Figure 3B:
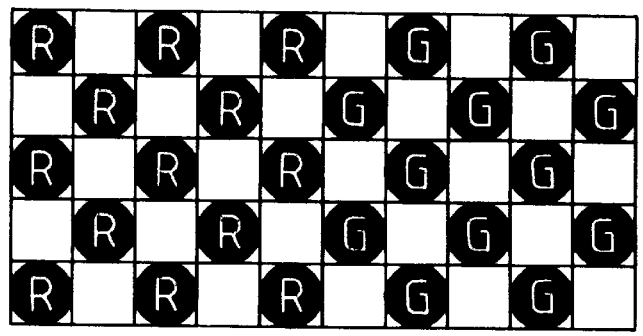

In the following there will be explained the above-mentioned conversion of recording data into the dot data by the controller 15, with reference to FIGS. 3A and 3B, in case a pixel is composed of a 5×5 dot matrix. FIGS. 3A and 3B show the results of printing in case two pixels of maximum density, respectively composed of 2×2 and 5×5 dot matrixes, are present in succession.

Since each dot in the dot matrix is recorded by an ink dot emitted from each discharge port of the recording heads 9A–9D and recorded on the recording medium, the above-mentioned line is recorded by five discharge ports arranged in the sub-scanning direction in each recording head. Consequently, when a pixel has the maximum density in the recording data, the 1st, 3rd and 5th of the discharge ports arranged in the sub-scanning direction (vertical in the drawing) are activated at first, and then the 2nd and 4th ports are activated at the next discharge timing, as shown in FIG. 3B. Thereafter the activated discharge ports are alternated, and the recording of a pixel is completed at the 3rd discharge from the 1st, 3rd and 5th ports. In the 2nd pixel, in relation to the final dot arrangement in the 1st pixel, the 2nd and 4th discharge ports in the vertical arrangement are activated at the first discharge timing, and then the 1st, 3rd and 5th discharge ports are activated. Thereafter the recording is continued as in the 1st pixel, and the recording of the 2nd pixel is completed at the 3rd discharge from the 2nd and 4th ports. Consequently the adjacent dots are diagonally disposed in each dot matrix, thereby maximizing the distance therebetween (hereinafter the dot arrangement with maximum distance means the diagonal arrangement).

The method of actual discharge of C, M, Y ink is as follows. In the structure shown in FIG. 1, the physical distance of the C, M and Y recording heads corresponds to a multiple of the interval of ink discharge timing, so that the inks are discharged when the recording heads arrive at positions corresponding to R, G in FIG. 3B. The R record is obtained by superposing M and Y inks, while the G record is obtained by superposing C and Y inks. The excessive ink resulting in such overlaid recording is rapidly and uniformly absorbed in the adjacent margins (non-recorded areas).

Thus, the above-explained conversion of the recording data into dot data provides a skipped dot matrix constituting a pixel, in which ink dots are uniformly distributed.

FIG. 3A shows a case in which each pixel is composed of a 2×2 dot matrix. In this case the dot arrangement in dot matrix is similar in different pixels.

The red (R) and green (G) dots shown in FIGS. 3A and 3B are respectively printed by overlaying two of C, M and Y inks, but they may be respectively printed with a single-colored red or green ink.

Also the dot arrangement maximizing the distance of adjacent dots reduces the overlapping area of such adjacent dots, thereby reducing the overflow of excessive ink or the ink blotting from such overlapping portion.

Also, as will be understood from FIG. 3B, the ink overflow or ink blotting is reduced for the same reason, at the portions where the red dot and green dot are adjacent, thereby preventing the mixing of different colors.

Also in case of recording with ink of a single color, each pixel may be composed of the dot arrangement as shown in FIGS. 3A and 3B, thereby obtaining the record with uniform density while preventing the ink blotting.

In case of recording on a recording medium of low ink absorbing ability such as an OHP film, a relatively large amount of ink has to be deposited in the pixel in order to obtain a desired density, and excessive ink may cause ink overflow, eventually leading to uneven color density. Also the conventional dot skipping as explained before on such recording medium does not allow uniform ink spreading, whereby desired density cannot be obtained.

Consequently according to the present invention, same dot matrix structure to that in the foregoing embodiment is employed also in the recording on the OHP film or the like. Thus there is enabled doubled (or more) printing on the same position for each color. There is thus obtained a preferable effect of density increase by such plural printings.

Figure 4:
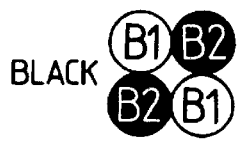
Figure 4:
Figure 4:
Figure 4:
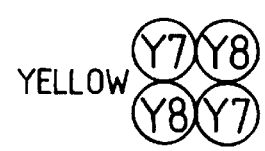

In the following there will be explained another embodiment. FIG. 4 is a schematic view showing a more preferable pixel structure in the case of recording on an OHP film with the recording apparatus shown in FIG. 1.

The purpose of the pixel structure shown in FIG. 4 is to obtain pixels of relatively high density by recording dots in all the positions of each pixel. Dots B1, C3, M5 and Y7 are recorded in the first main scanning motion of the recording heads 9A–9D, and dots B2, C4. M6 and Y8 are recorded, in the second scanning motion, in the positions not recorded in the first scanning motion. In this method, the overflowing of excessive ink can be reduced because the dots printed in the 1st scanning are fixed to a certain level in the period between the 1st and 2nd scanning motions, and because the dots recorded each time are diagonally positioned.

Thus, in the recording on a recording medium with relative low ink absorbing ability such as plain paper or OHP film, there may be employed dot skipping in time or in space, and, in such case the dot skipping by the dot matrix structure of the above-explained embodiment is effective for the recording quality.

On the other hand, on a recording medium of relatively high ink absorbing ability such as coated paper, such dot skipping is unnecessary, and there may be conducted so-called fully filled or all-black recording in which each pixel is fully filled with the dots. In the recording mode shown in FIG. 4, a uniform image can be obtained even if the ink droplets used for the second scanning are made smaller than those used in the first scanning. Although FIG. 4 illustrates only one pixel, the adjacent pixel satisfies the relation shown in FIG. 3B.

However, even in case of recording on coated paper, such fully filled recording is not necessarily essential, since the number of dots constituting a pixel can be increased if the pitch of discharge apertures is reduced on the recording head. In such case, the dot matrix structure of the present invention allows to increase the recording speed and to reduce the ink consumption, while retaining the advantage of the present invention that high quality image can be attained by uniform dot spreading.

Thus the recording apparatus may be so constructed with means for setting a recording mode as to effect the recording operation in various recording modes, according to the recording medium employed and the dot matrix structure constituting each pixel. As explained in the foregoing, the present embodiment is capable of improving the image quality within each pixel and between adjacent pixels in the main scanning direction of the recording heads.

In the foregoing embodiments there have been explained cases in which the number of dots constituting a pixel corresponds to the maximum density or the maximum number of dots recordable in a scanning operation (hereinafter called maximum dot number), but the present invention is applicable also to a case in which the number of dots constituting a pixel does not corresponds to the maximum density.

Figure 5A:
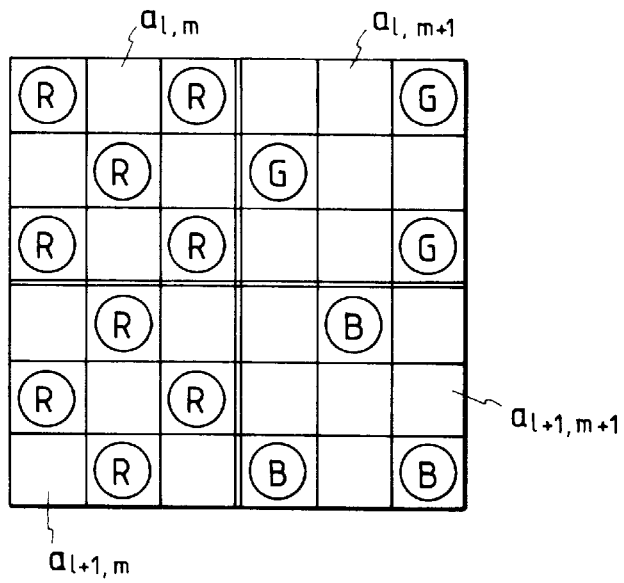
FIGS. 5A and 5B are schematic views showing embodiments of dot matrix pattern of the present invention.
Figure 5B:
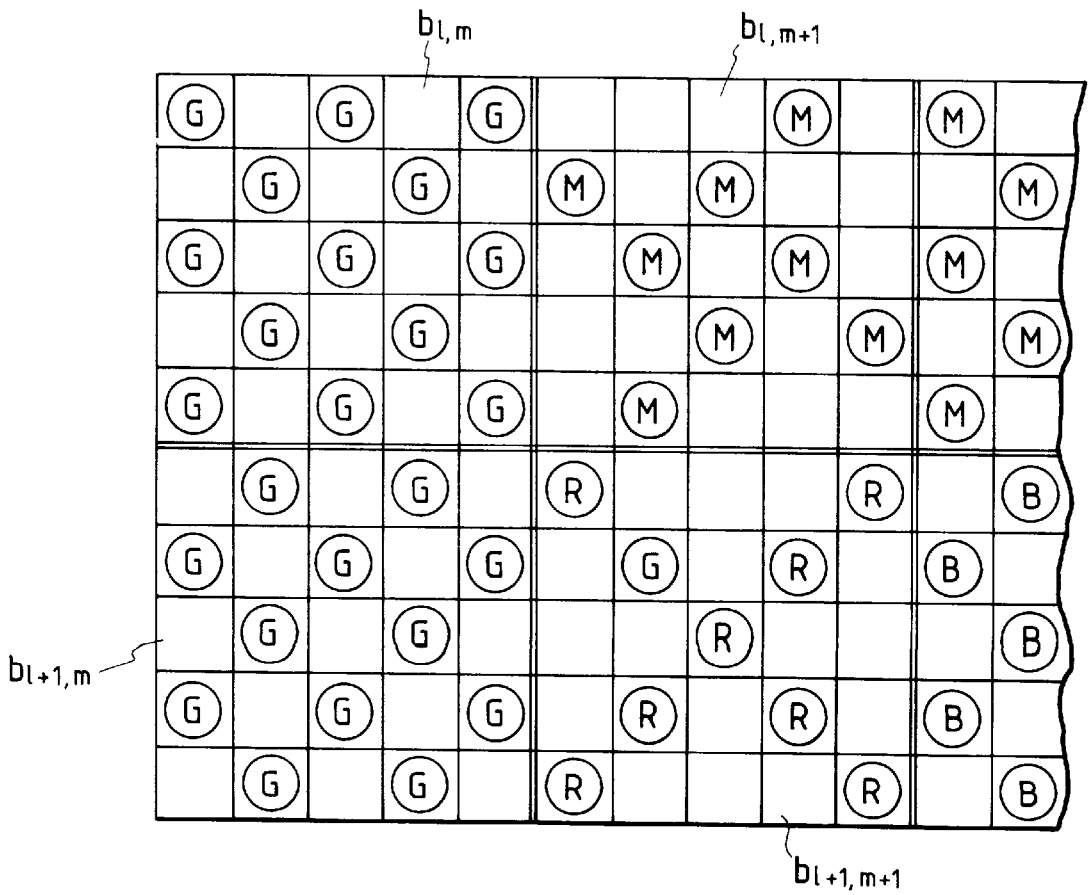

FIGS. 5A and 5B are schematic views showing examples of pixel structure with a 3×3 matrix in such case.

In FIG. 5A, a pixel $a_{l,m}$ has the maximum density of red (R) (maximum dot number), and is formed by a dot pattern in the foregoing embodiments. Another pixel $a_{l+1,m}$ also has the maximum density in red, but has a different dot pattern (dot number being one less), due to the relation with the adjacent pixel $a_{l,m}$, namely the condition that the adjacent dots at the boundary are positioned at the maximum distance.

Pixels $a_{l,m+1}$ and $a_{l+1,m+1}$ are respectively green (G) and blue (B) of a lower density than that of the foregoing pixels. Also in such pixels of lower density, composed of a number of dots less than the maximum dot number, the dot pattern is so formed as to maximize the distance of the adjacent dots within each pixel, and to maximize the distance to the dots of the adjacent pixel.

The pixels $a_{l,m+1}$ and $a_{l+1,m+1}$ shown in FIG. 5A contains a blank row or column in the dot pattern, but a dot or dots are placed, in the adjacent pixel, on the extension said blank row or column, in order to avoid the formation of a blank row or column in the entire image.

FIG. 5B is a schematic view showing an example of pixel composed of 5×5 dot matrix.

The pixel of 5×5 dots is constructed in the same principle as in FIG. 5A. Pixels $b_{l,m}$, $b_{l+1,m}$ are green of maximum density, but are different in the dot pattern and the number of dots, due to the mutually adjacent relation. Pixels $b_{l,m+1}$, $b_{l+1,m+1}$ are respectively magenta (M) and red (R) of lower densities, and have dot patterns designed to maximize the distance of adjacent dots both within each pixel and at the boundary of the pixels.

The dot pattern in each pixel and the positional relationship of dots at the boundary of pixels explained above are retained over the entire image recorded.

FIGS. 6A to 6D illustrate an example of dot arrangement in such case.

Figure 6A:
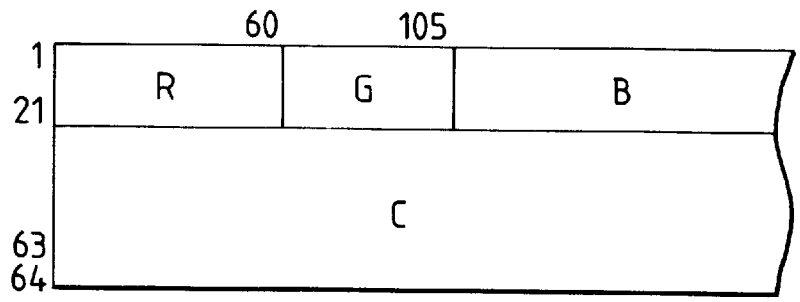
FIGS. 6A to 6D are schematic views showing a mode of image recording with pixels of a dot matrix pattern embodying the present invention.

FIG. 6A is a schematic view showing an embodiment of recording with the recording heads 9A–9D shown in FIG. 1. Dots are formed by ink droplet discharge from 64 discharge ports arranged in the sub scanning direction in each recording head, and a pixel is formed by a 3×3 matrix of said dots. There is considered an image composed of a red area in the 1st–21st columns in the 1st–60th rows, a green area in the 61st–105th columns, a blue area starting from the 106th column, and a cyan area in all the columns in the 22nd–63rd rows.

Figure 6B:
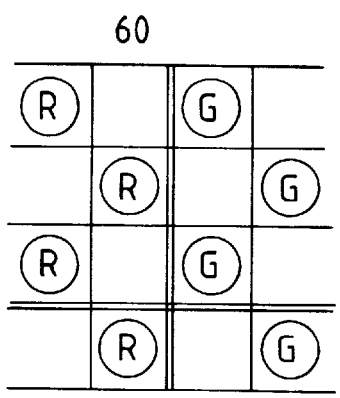
Figure 6C:
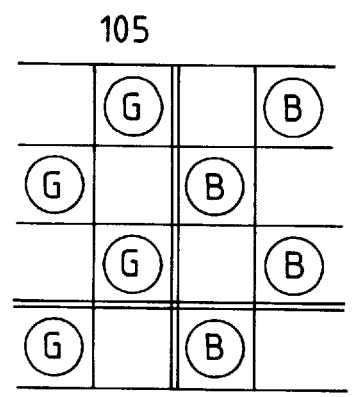
Figure 6D:
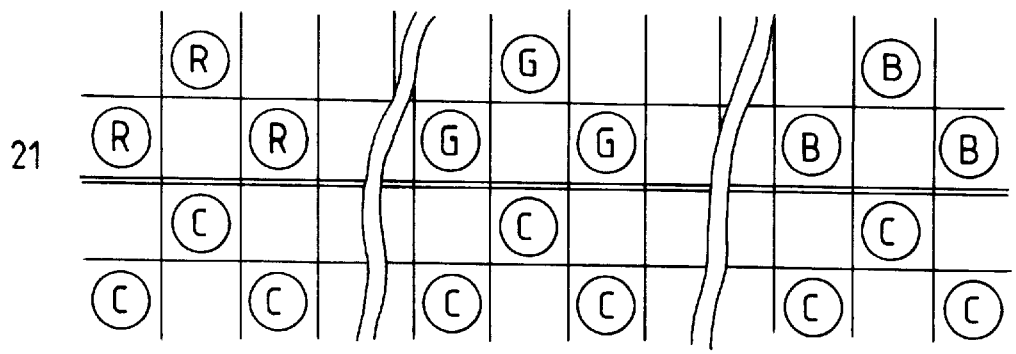

FIGS. 6B–6D show the details of boundaries of these color areas. Also at such boundaries, the dot pattern is so designed as to maximize the distance of adjacent dots as explained above.

Figure 7:
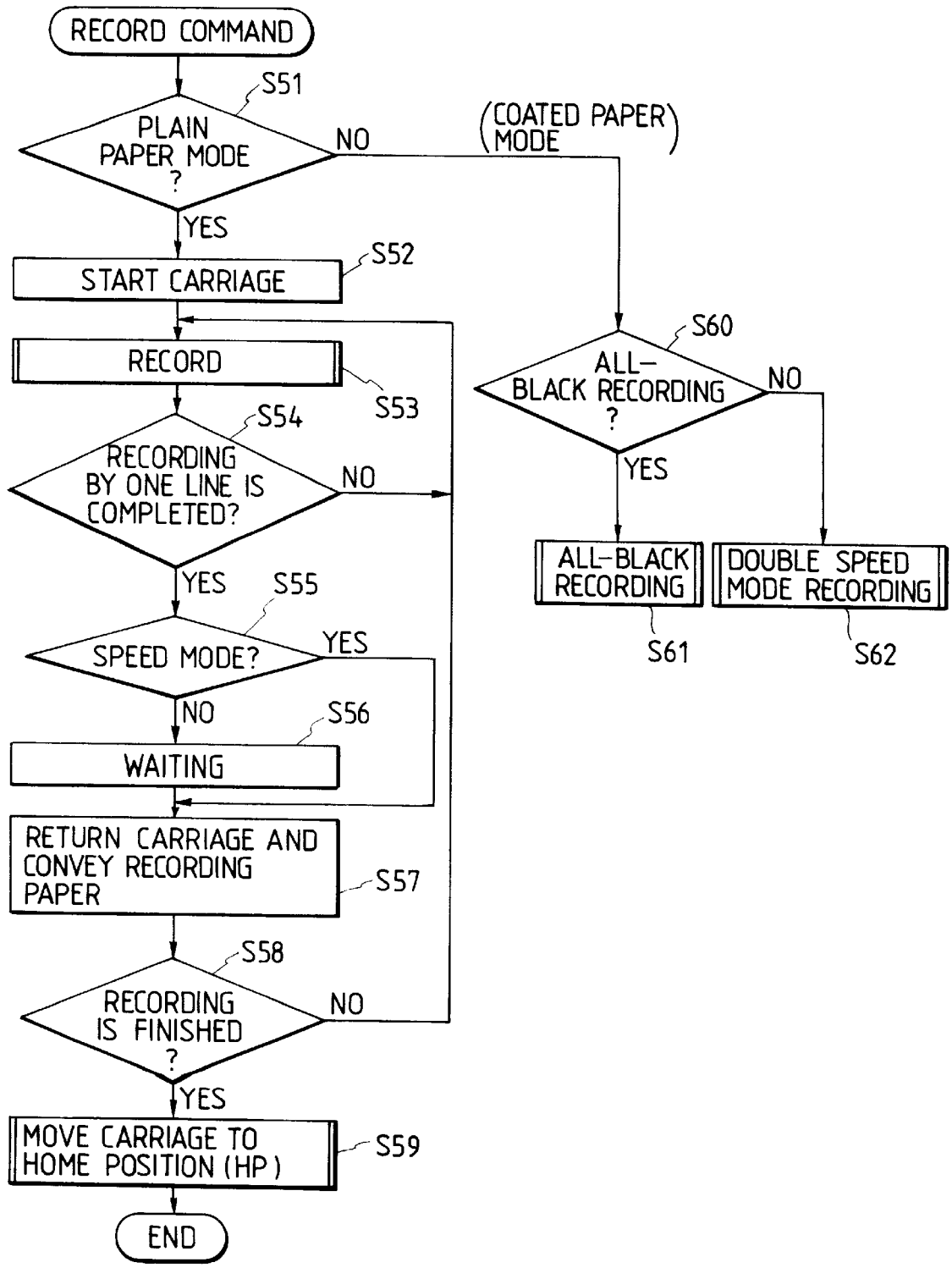
FIG. 7 is a flow chart of recording sequence of an ink jet recording apparatus embodying the present invention.

FIG. 7 is a flow chart of the recording sequence with the above-explained dot pattern. At first a step S51 discriminates whether the recording medium is of relatively low ink absorbing ability, such as plain paper or OHP sheet, and, if affirmative, the recording operation is executed in the plain paper mode starting from a step S52.

More specifically, the step S52 starts the carriage movement, then a step S53 executes the recording of a line based on the above-explained dot pattern, and a step S54 discriminates whether the recording of said line is completed. If completed, a step S55 discriminates whether the recording operation is in a speed mode. If not, a step S56 interrupts the carriage movement for a predetermined period. Then a step S57 returns the carriage to the recording start position for the recording of a next line, and advances the recording sheet by a line. On the other hand, if the discrimination in the step S55 is affirmative, the sequence proceeds directly to the step S57.

If the recording plane of the recording medium is vertical, the deposited ink tends to flow by gravity, and there may result ink blotting at the boundary of lines if the next line is recorded before the preceding line is fixed. Deterioration in image quality resulting from such ink blotting becomes particularly evident in case different colors are present at the boundary, because of color mixing. The suspension of the operation for a predetermined period in the step S56 is for preventing such ink blotting.

After the carriage return and the advancement of recording sheet in the step S57, a step S58 discriminates whether the recording operation is completed, and, if completed, a step S59 returns the carriage to the home position and terminates the sequence. If not, the sequence returns to the step S53 to proceed to the recording of the next line.

On the other hand, if the step S51 discriminates that the recording medium employed is not plain paper but coated paper, a step S60 discriminates whether the fully filled recording is requested. Then the sequence branches to a fully filled recording mode explained above (step S61) and a double-speed recording mode (step S62; pixel being composed of the dot matrix structure of the present invention), and the recording operation is conducted in the substantially same manner as the recording operation starting from the step S52, except for the structure of pixel.

The above-explained recording modes can be selected by a command from the host equipment or by an operation panel attached to the recording apparatus.

Figure 8A:
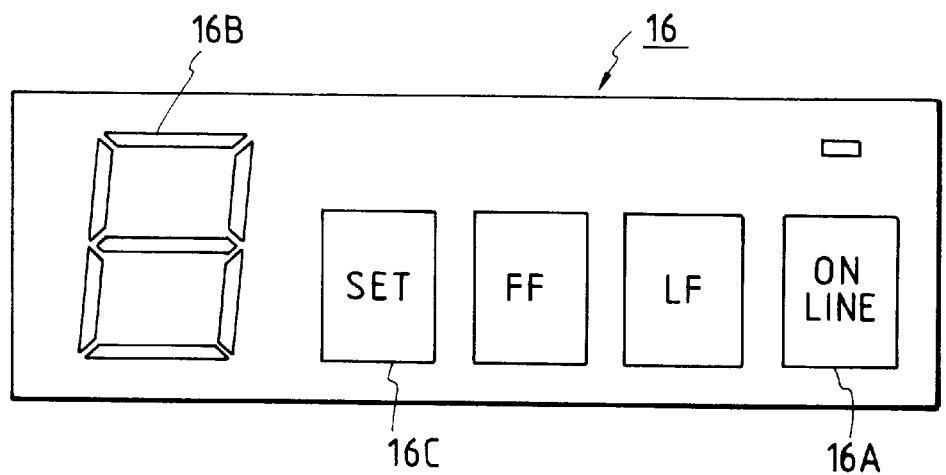
FIGS. 8A and 8B are schematic front views showing two embodiments of a panel shown in FIG. 1.
Figure 8B:
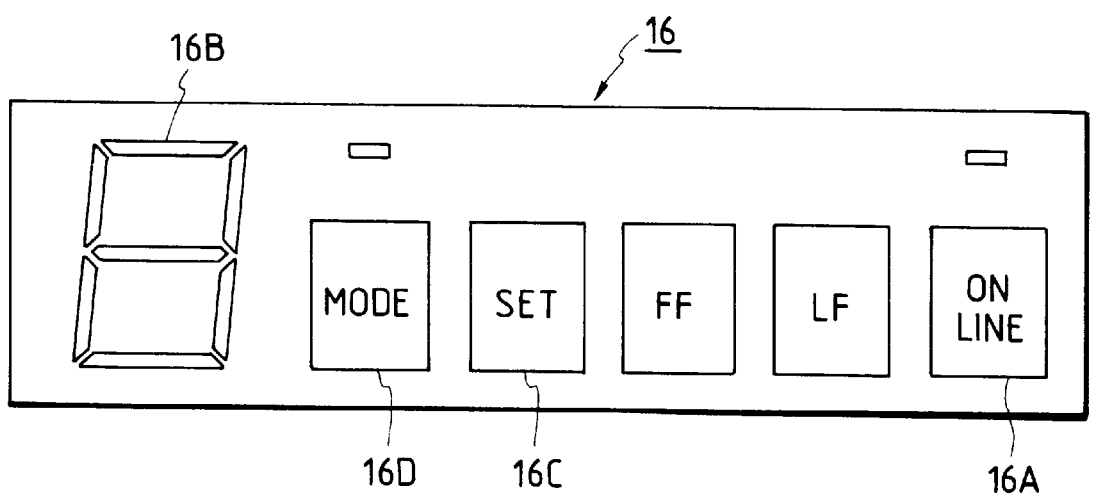
Figure 9A:
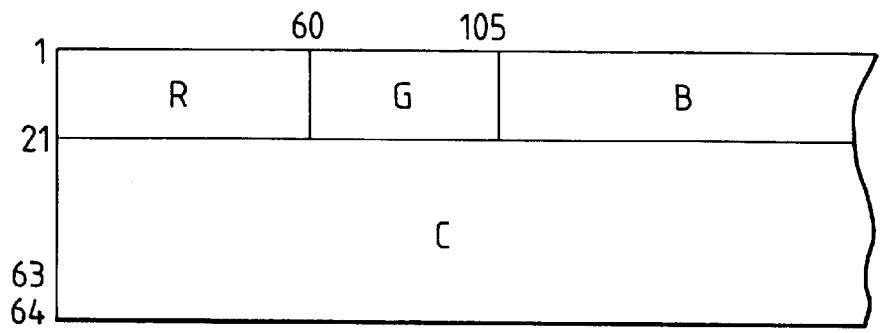
FIGS. 9A to 9D are schematic views of another embodiment applied to fill in the dot matrix pattern of the embodiment shown in FIGS. 6A to 6D, wherein the dots indicated by a suffix 2 are printed in a second scanning.
Figure 9B:
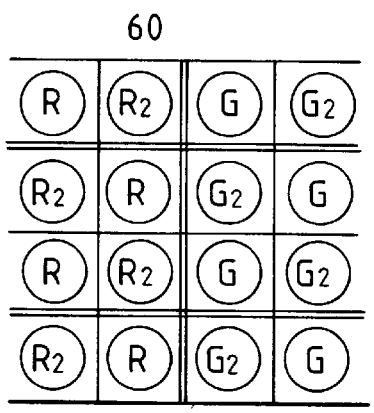
Figure 9C:
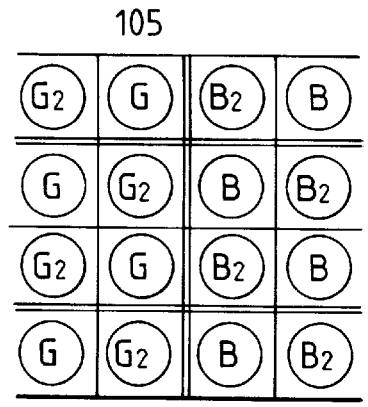
Figure 9D:
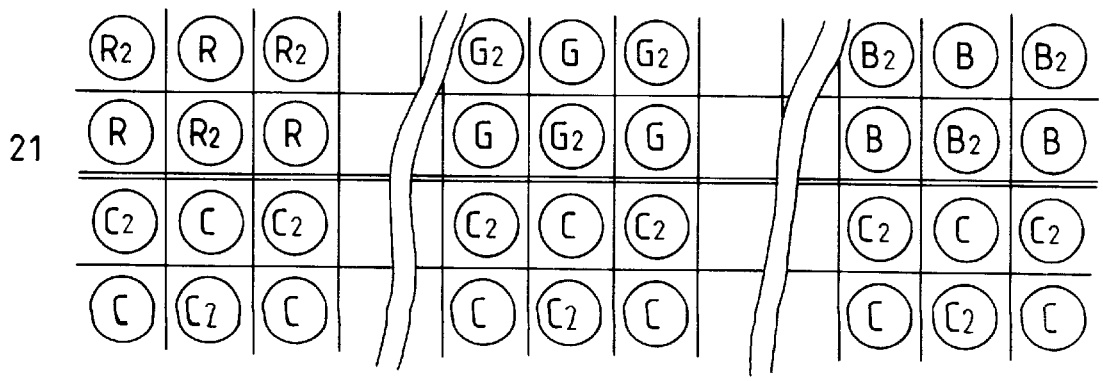

FIG. 8A and 8B are schematic front views showing the details of a panel 16 shown in FIG. 1.

In FIG. 8A, the recording mode is set by a set key 16C in combination with other keys, according to the recording sheet employed, and a 7-segment display unit 16B is provided for indicating the mode.

In FIG. 8B, there are provided a mode key 16D and a set key 16C for improving the operability.

In the foregoing embodiments there have been explained apparatus having so-called serial type recording heads for effecting the recording operation by the movement of recording heads, but the present invention is applicable also to an apparatus having so-called full-multi recording head in which plural discharge ports are arranged corresponding to the width of the recording medium.

Furthermore the present invention is not limited to the ink jet recording apparatus but is applicable to any apparatus for forming a record by depositing ink onto a recording medium, with similar advantages.

FIGS. 9A to 9D show pixels formed by two printings shown in FIG. 4, obtained by forming the dots of different colors indicated by a suffix "2", on the recording medium after first printing as shown in FIGS. 6A–6D. The second printing is preferably conducted line by line, but may be conducted after the first printing is made on the recording medium in a state as shown in FIGS. 6A–6D. In the latter case the recording head is preferably made movable in the sub scanning direction, such as an ink jet pen.

In case of FIGS. 9A–9D, the foregoing drawbacks can be avoided and the image density can be elevated by forming the pixels as shown in FIGS. 9A–9D, by forming the dots R, G, B at first and then the dots R2, G2, B2.

The dots R, R2 are preferably formed with a same amount of ink for simplifying the structure of the apparatus, but in practice the first recorded dot R is formed with a smaller amount of ink than that of the ink used for forming the second recorded dot, in order to secure the fixation of the first recorded dot.

As shown in FIGS. 9A–9D, the drawbacks in the prior art can be prevented and the high image quality can be obtained, by an arrangement of plural dots formed in succession for forming a pixel in such a manner that said dots are not continuous but are mutually complementary in the vertical and horizontal directions, both in each pixel and at least in the boundary area of adjacent pixels. Furthermore, in the structure shown in FIGS. 9A–9D, the effect of the present invention is made even more evident as plural recording is employed also in the second printing.

Among various ink jet recording methods, the present invention provides a particularly remarkable effect in the recording head or recording apparatus of the bubble jet method proposed by the present assignee.

The representative structure and the working principle of this bubble jet recording are disclosed, for example, in the U.S. Pat. Nos. 4,723,129 and 4,740,796. This method is applicable both to so-called on-demand and continuous ink jet apparatus, but is particularly effective for the on-demand ink jet recording apparatus, by applying at least a drive signal, to an electrothermal converter positioned corresponding to a sheet or a liquid path supporting liquid (ink), to cause a rapid temperature increase exceeding the nucleate boiling corresponding to the recording information, thereby causing said electrothermal converter to generate thermal energy and inducing film boiling on the heat action face of the recording head, thereby forming a bubble in the liquid in one-to-one correspondence to said drive signal. Said liquid (ink) is expelled from the discharge port by the expansion and contraction of said bubble, thereby forming at least a droplet. The drive signal is preferably formed as a pulse, because it can realize immediate expansion and contraction of the bubble, thereby achieving ink discharge with excellent response. Such pulse-shaped drive signal is preferably formed as disclosed in the U.S. Pat. Nos. 4,463,359 and 4,345,262. Also further improved recording can be achieved by employing the condition disclosed in the U.S. Pat. No. 4,313,124, relating to the temperature increase rate of the heat action face mentioned above.

The structure of the recording head includes not only the combinations of discharge port, liquid path and electrothermal converter as disclosed in the above-mentioned patents (linear orthogonally bent liquid path) but also those in which the heat action face is positioned at the bending portion, as disclosed in the U.S. Pat. Nos. 4,558,333 and 4,459,600. In addition the present invention is applicable to a structure in which the discharge port is formed by a slit common to plural electrothermal converters as disclosed in the Japanese Laid-Open Patent Application No. 59-123670, or a structure in which the discharge port is formed by a port absorbing the pressure wave of thermal energy, as disclosed in the Japanese Laid-Open Patent Application No. 59-138461.

Furthermore the present invention can provide the aforementioned advantages more effectively in a full-line recording head, having a length corresponding to the maximum recordable width of the recording medium, regardless whether said recording head is composed of a combination of a plurality of recording heads disclosed in the aforementioned patents, or is formed integrally as a single head.

The present invention is furthermore effective in a replaceable recording head which becomes electrically connected to the recording apparatus and receives ink supply therefrom upon mounting on the apparatus, or a recording head formed as an integral cartridge.

Furthermore, the addition of recovery means for the recording head and/or auxiliary means therefor is preferable in stabilizing the effect of the present invention. More specifically, preferred for stable recording are capping means for the recording head, cleaning means therefor, pressurizing or suction means therefor, preliminary heating means composed of the electrothermal converting element and/or another heating element, and the preliminary ink discharge operation for effecting ink discharge independent from the recording operation.

Furthermore, the present invention is extremely effective for a recording apparatus having not only a single-color recording mode for example with black color but also at least one of a multi-color recording mode and a full-color recording mode, regardless whether the recording head is integrally formed as a single unit or composed of plural units.

Although the foregoing embodiments employ liquid ink, the present invention is likewise applicable to ink which is solid or in a softened state at room temperature. In the above-mentioned ink jet recording apparatus, the ink is generally temperature controlled within a temperature range from 30° C. to 70° C. to maintain the ink viscosity at a stably dischargeable state, so that there may be employed any ink that is liquid at the supply of recording signal. Furthermore the present invention may employ ink that liquefies only at the application of thermal energy, such as ink of which temperature increase by the thermal energy is prevented by phase change from solid to liquid, ink which is stored in solid state for the purpose of preventing evaporation, or ink which starts to solidify before reaching the recording medium. In such cases, the ink may be supported, in liquid or solid state, in a recess or a hole formed in a porous sheet positioned opposed to the electrothermal converting element, as disclosed in the Japanese Laid-Open Patent Application Nos. 54-56847 and Sho 60-71260. Among such various inks, the present invention is most effectively applicable to the ink capable of membrane boiling mentioned above.

As detailedly explained in the foregoing, the present invention provides pixels with reduced ink blotting and with uniform ink spreading, by such dot arrangement as to maximize the distance therebetween within a dot matrix constituting a pixel and at the boundary of adjacent pixels.

Also there is enabled so-called fully filled recording by plural recording operations with a time interval therebetween.

Also there is enabled a double-speed recording, depending on the scanning speed.

Consequently there is provided a recording apparatus capable of preventing the loss or unevenness in the density according to the recording medium to be employed, thus achieving stable image quality.

There is furthermore enabled more flexible density control and high-speed recording.

What is claimed is:

1. A method of recording a color image, having a plurality of colors, on a recording medium by using ink jet recording means capable of discharging ink droplets having different colors, the color image including a portion where pixels, each having a different color, are arranged adjacent to each other in a horizontal or vertical direction and each pixel being comprised of a dot matrix where a plurality of dots are arranged, said method comprising the steps of:

applying ink to the recording medium to form a first dot group having a plurality of dots forming a first pixel by using the ink jet recording means;

applying ink to the recording medium to form a second dot group having a plurality of dots forming a second pixel adjacent to the first pixel by using the ink jet recording means; and controlling application of ink during said applying steps to form the dots of the first dot group and the dots of the second dot group so that, for any arrangement of dots in the first dot group and any arrangement of dots in the second dot group, the dots in the second dot group are not adjacent to the dots in the first dot group in a horizontal or vertical direction at a border between the first pixel and the second pixel, wherein the pattern of dots in the first dot group is different from the pattern of dots in the second dot group.

2. A method according to claim 1, wherein the first dot group and the second dot group are applied with one or a plurality of colors through said ink jet recording means.

3. A method according to claim 2, wherein the ink jet recording means has a plurality of recording heads each discharging ink of a different color and said plurality of recording heads are scanned and moved in an arranged direction to record a color image.

4. A method according to claim 3, wherein said method is adapted to form pixels in the course of a scanning motion of the recording heads relative to the recording medium, wherein the adjacent pixels include those arranged in the direction of the scanning motion, and those adjacent with one pixel being formed in a recorded line formed by one scanning motion and another pixel being formed in another recorded line formed by a next scanning motion.

5. A method according to claim 1, wherein said ink jet recording means discharges ink by causing a state change in the ink.

6. A method according to claim 1, wherein the dots in the second dot group at the border which are applied adjacent to the dots in the first dot group are separated by a maximum distance.

7. A method according to claim 1, wherein the dots in the first and second pixels are applied adjacent to each other and are separated by a maximum distance.

8. A method of recording an image on a recording medium by using ink jet recording means for discharging at least one ink droplet, the image including a plurality of pixels arranged adjacent to each other in horizontal and vertical directions and each pixel being comprised of a dot matrix in which a plurality of dots are arranged in a horizontal and vertical direction, said method comprising the steps of:

applying ink to the recording medium to form a first dot group having a plurality of dots forming a first pixel by using the ink jet recording means; and applying ink to the recording medium to form a second dot group having a plurality of dots forming a second pixel adjacent to the first pixel by using the ink jet recording means; and controlling application of the inks during the applying steps to form the dots of the first dot group and the dots of the second dot group so that, for any arrangement of dots in the first dot group and any arrangement of dots in the second dot group, the dots in the second dot group are not adjacent to the dots in the first dot group in a horizontal and vertical direction at a border between the first pixel and the second pixel, wherein the pattern of dots in the first dot group is different from the pattern of dots in the second dot group.

9. A method according to claim 8, wherein the dots in the second dot group at the border which are applied adjacent to the dots in the first dot group are separated by a maximum distance.

10. A method according to claim 8, wherein the dots in the first and second pixels are applied adjacent to each other and are separated by a maximum distance.

11. A method according to claim 8, wherein the ink jet recording means discharges ink droplets of a plurality of colors and further comprising applying the first dot group and the second dot group with ink of one or more colors through the ink jet recording means.

12. A method according to claim 11, wherein the ink jet recording means has a plurality of recording heads each discharging ink of a different color and further comprising scanning the plurality of recording heads in a predetermined direction to record a color image.

13. A method according to claim 12, further comprising scanning of the recording heads in a scanning direction relative to the recording medium to form a plurality of pixels, a pixel being formed in a recorded line during one scanning motion and an adjacent pixel in the scanning direction being formed in another recorded line during a next scanning motion.

14. A method according to claim 8, further comprising discharging ink from the ink jet recording means by causing a change in state in the ink.

* * * * *